United States Patent [19]

Kumar-Misir

[11] Patent Number: 4,811,973
[45] Date of Patent: Mar. 14, 1989

[54] BOUND BOOK WITH BOUND HOLDER CARRYING LOOSE-LEAF PAGES

[76] Inventor: Victor Kumar-Misir, 33 Burnview Cresc., Scarborough, Ontario, Canada, M1H 1B4

[21] Appl. No.: 23,357

[22] Filed: Mar. 9, 1987

[30] Foreign Application Priority Data

Mar. 25, 1986 [CA] Canada ........................... 505085

[51] Int. Cl.⁴ ................. B42D 1/00; B42D 1/06; G09B 17/02; B42F 13/00
[52] U.S. Cl. ................. 281/21 A; 281/25 R; 283/46; 402/79
[58] Field of Search ............ 281/21 A, 21 R, 22, 281/25 R, 25 A, 28; 283/45, 46, 57, 90, 91, 92; 282/8 C, 8 R, 29; 402/79, 500, 501, 502; 434/178

[56] References Cited

U.S. PATENT DOCUMENTS

| 758,220 | 4/1904 | Sixbey | 281/25 R |
| 2,583,998 | 1/1952 | Cook | 281/25 R |
| 2,677,376 | 5/1954 | Brunner | 402/79 |
| 3,620,553 | 11/1971 | Donovan | 402/79 |
| 4,403,883 | 9/1983 | Sorin | 281/25 R |
| 4,428,733 | 1/1984 | Kumar-Misir | 283/46 |

FOREIGN PATENT DOCUMENTS

| 7902236 | 9/1980 | Netherlands | 402/501 |
| 98792 | 5/1940 | Sweden | 402/79 |
| 502195 | 3/1939 | United Kingdom | 434/178 |

Primary Examiner—Frank T. Yost
Assistant Examiner—Paul M. Heyrana, Sr.
Attorney, Agent, or Firm—Rogers, Bereskin & Parr

[57] ABSTRACT

A book containing question or other instruction pages permanently bound therein by a binding such as a spiral wire binding. A holder of small lateral dimension is also bound by the permanent binding and carries loose-leaf answer or work pages secured to the holder by a loose-leaf binding such as a bendable metal strip. The book can be laid open flat or folded back on itself. The work pages can be used up and then replaced.

12 Claims, 2 Drawing Sheets

BOUND BOOK WITH BOUND HOLDER CARRYING LOOSE-LEAF PAGES

FIELD OF THE INVENTION

This invention relates to a book having a set of permanent pages intended for repeated use, and also having a set of disposable pages which are consumed through use and which must periodically be replaced.

BACKGROUND OF THE INVENTION

In my Canadian Pat. No. 1,200,977, issued Feb. 25, 1986, an information gathering system is described in which sets of questions are printed on question sheets which are aligned in a specific way as described in the patent. Answers are marked on a set of answer sheets aligned with the question sheets. After the answers have been completed by a user, the answer sheets may be removed for analysis. The system is useful in many question and answer situations but is particularly suitable for use by a doctor who must obtain certain basic information from a new patient before handling the patient's particular health problem. As described in the patent, the question sheets may be in one language and the answer sheets may be in a different language.

The present invention deals with the problem that while the question sheets are intended for repeated use, each answer sheet can only be used once. The answer sheets are therefore eventually used up and must be replenished. Practical systems used in the past to contain the question and answer pages were therefore loose-leaf arrangements in which all of the pages were held together detachably in one of various ways, so that when the question sheets were used up, the entire structure could be taken apart and fresh question sheets could be added. This arrangement was bulky, expensive, did not readily lie flat, and could not conveniently be folded back on itself.

BRIEF SUMMARY OF THE INVENTION

It is therefore an object of the present invention to provide a book for holding permanent pages and disposable pages in which the above identified disadvantages are reduced. In one of its aspects the present invention provides a book containing a set of first pages, a holder member, a substantially permanent binding securing said first pages and said holder member in said book, a second set of pages, and means removably attaching said second set of pages to said holder member so that said second set of pages can be removed and replaced.

A preferred embodiment of the invention will now be described, with reference to the accompanying drawings.

DETAILED DESCRIPTION OF PREFERRED EMBODIMENT

Figure 2:
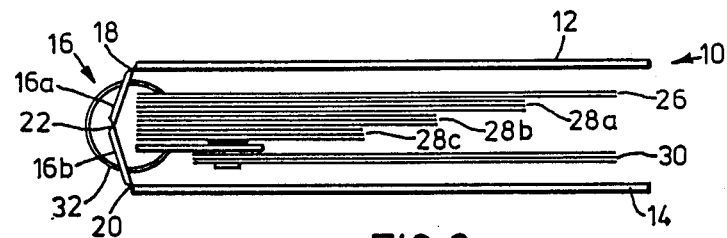
FIG. 2 is an end view of the book of FIG. 1 (exaggerated in thickness for clarity)

As shown in the drawings, there is provided a book 10 having a front cover 12, a back cover 14 and a spine 16. The front and back covers 12, 14 and the spine 16 are all formed from a single integral sheet of plastic. The plastic is thinned where the front cover 12 meets the spine 16, thereby forming a front plastic hinge 18 (FIG. 2). The plastic also thins where the back cover 14 meets the spine 16, forming a rear plastic hinge 20. In addition the spine consists of front and back portions 16a, 16b joined by a thinned section which forms a spine hinge 22 extending the entire length of the spine.

The exemplary book shown contains five sets of pages, namely a set of explanatory pages 26, three sets of question pages 28a, 28b, 28c, and a set of answer pages 30. The explanatory pages 26 and all the question pages are substantially permanently bound in the book by a conventional wire ring binding 32. The wire ring binding 32 extends through holes 34 in the pages 26, 28a, 28b, 28c and through holes 36 in the spine 16.

The answer pages 30 must be removable and replaceable, and therefore they are not bound with the remainder of the pages. Instead, a plastic strip or holder 40, typically of the same material (including the same thickness) as the front and rear covers 12, 14 is punched with holes 42 (FIG. 4) and is bound by the wire ring binding 32 with the remainder of the pages 26 and 28a, 28b, 28c. The plastic strip 40 extends laterally outwardly toward the outer edge 44 of the rear cover 14 for a short distance, but not so much as to obscure a large portion of the answer pages 30. The plastic strip 40 has two holes 46 punched in a central portion thereof, laterally outwardly of the binding 32. The answer pages 30 are punched with corresponding holes 48 which align with the holes 46. A conventional bendable metal strip 50 extends through the holes 46 in the plastic strip 40, through the holes 48 in the answer pages 30, and has its ends 51 bent over as shown in FIG. 5 to secure the answer pages in position.

Figure 5:
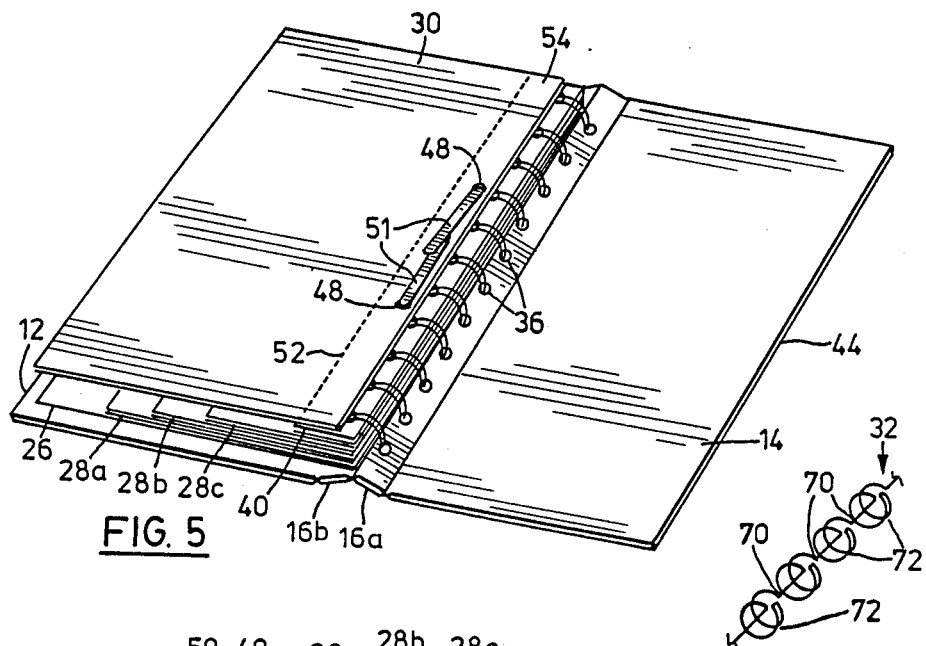
FIG. 5 is a view similar to that of FIG. 3 but showing all of the in position on the left hand side of the spine.

Each answer page 30 is also scored with a line of perforations 52 as shown in FIG. 5. The perforations 52 are located laterally inwardly of the outer edge of plastic strip 40, thereby defining an inner portion 54 for each answer page. Thus, when each answer page has been used, its outer portion can be removed by tearing along the line of perforations 52 and can be taken away for analysis. After all of the answer pages 30 have been used, the bendable metal strip 50 can be opened; the inner portions 54 of the answer pages can be removed, and a new set of answer pages can be placed in position on the bendable metal strip 50.

Figure 3:
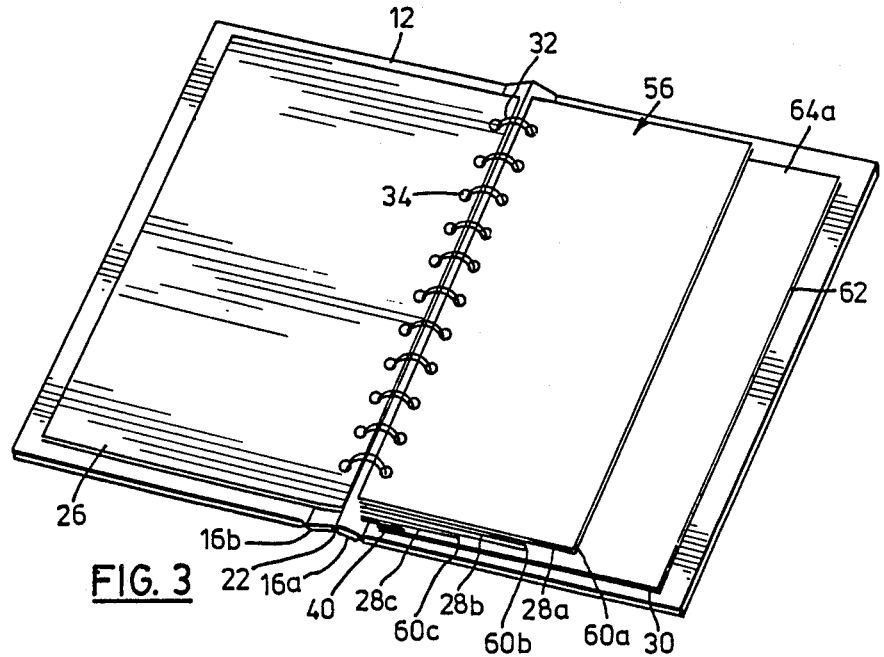
FIG. 3 is a perspective view of the book of FIG. 1, in open position with the instructional sheets displayed on both sides of the spine.

In a preferred embodiment of the invention the question pages 28a, 28b, 28c contain medical questions, as indicated at 56 in FIG. 3, and the answer pages containing columns of answer numbers which correspond with the numbers of the questions on the question page. Each answer number is followed by a plus sign indicating a yes and a minus sign indicating a no. The patient circles the appropriate sign on the answer page when answering each question.

Figure 4:
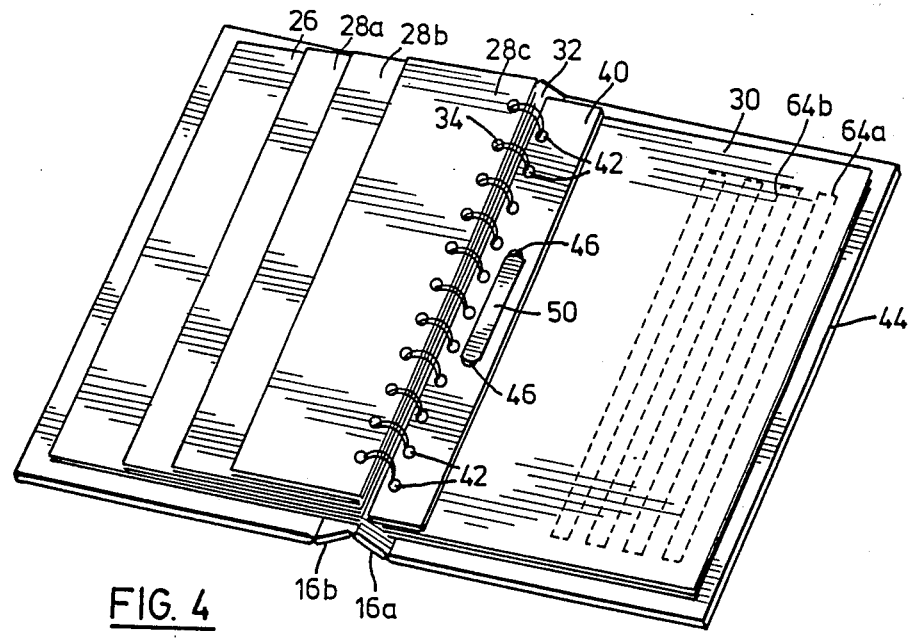
FIG. 4 is a view similar to that of FIG. 3 but showing all of the instructional sheets on the left hand side of the spine and the loose-leaf sheets on the right hand side of the spine.

In the embodiment described, the front or uppermost question pages 28a have their outer edges 60a (FIG. 3) spaced inwardly of the outer edge 62 of the answer page 30, exposing a first column 64a of numbers corresponding to the questions on the question pages 28a, for the patient to answer. After the questions on the first set of question pages 28a have been answered, the second set of question pages 28b is exposed. The outer edges 60b of the second or middle set of question pages 28b are located inwardly of the outer edges 60a of the first set of question pages 28a, and are aligned with the edge of a second answer column 64b (FIG. 4). The second answer column 64b was covered by the first set 28a of question pages initially, so as not to confuse the patient while questions on pages 28a were being answered.

The patient now answers the questions on the second set of question pages 28b by circling appropriate plus or minus signs in the second answer column 64b, until the second answer column 64b has been completed. The patient then proceeds in a similar manner to the third set of answer pages 28c, whose outer edges 60c are displaced inwardly from the outer edges 60b of the second and overlying answer pages. As described, when the answer page 30 has been finally completed, it can be torn from the book and taken away for analysis.

Figure 1:
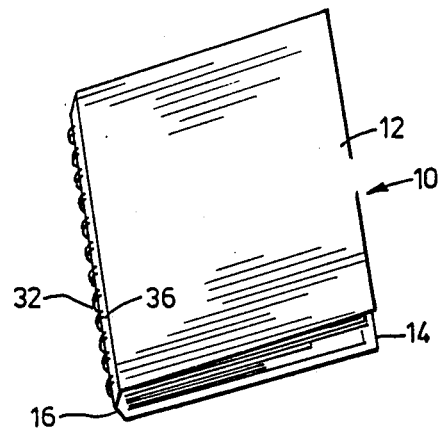
FIG. 1 is a perspective view of a typical book according to the invention, in closed position and looking at its front cover.

In use, because of the ring binding 32, the book may be laid open flat as shown in FIGS. 3 to 5. In this configuration the spine 16, which was generally convex (as viewed from the outside of the book) in FIG. 1, assumes an opposite curvature, i.e. The spine halves 16a, 16b bend upwardly at hinge 22 as shown in FIG. 3, thereby allowing the book to lie completely flat without resistance. The pages can then be easily turned by a patient.

Figure 6:
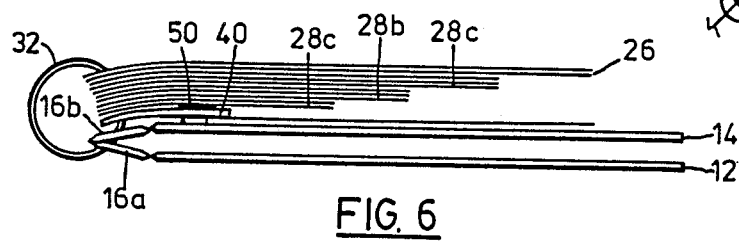
FIG. 6 is an end view of the book of FIG. 1 but showing the front cover folded over and underlying the back cover (again exaggerated in thickness for clarity)

If the available space is limited, then the front cover 12 can be folded completely over behind the rear cover, as shown in FIG. 6. In this configuration the curvature of the spine 16 again reverses, the two spine halves 16a, 16b forming an acute angle and allowing the front cover 12 to lie closely behind the rear cover 14. Again the pages lie flat in the FIG. 6 configuration, facilitating use of the book.

Figure 7:
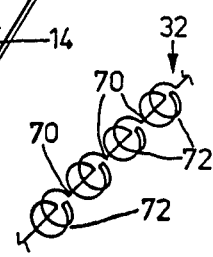
FIG. 7 is a perspective view of a portion of the ring binding of the book of FIG. 1.

The ring binding 32 is typically of the form shown in FIG. 7, arranged in a form of spiral in which a continuous piece of wire is formed in wide spaced loops 70 separated by narrow pairs of spaced loops 72. However a conventional fixed pitch continuous spiral ring binding may be used, or other kinds of bindings may be used if desired.

In addition, while the answer pages 30 have been shown as fixed to the plastic strip 40 by a bendable metal strip 50, other conventional forms of loose-leaf binding may also be used if desired. However the arrangement shown has the advantage that it lies flat and is sufficiently secure, yet it is relatively inexpensive.

While the book has been shown as particularly adapted to medical questions and answers, it may be used for other questions and answers, or indeed for any applications where some of the pages are permanent, and where other pages are used and then must be replaced.

It will also be appreciated that other changes may be made in the embodiment described. For example the strip 40 need not be between the pages 26, 28a, 28b, 28c and the pages 30; instead it can be behind the pages 30, in which case it need not be of small lateral dimension (although it is less costly if it is of small lateral dimension). Alternatively the strip 40 can be in the location shown but can be a full page with cutouts to expose answer areas where answers are to be inserted. The strip 40 can be of any suitable material, not simply plastic but also cardboard, leather, etc.

The means for securing the disposable pages 30 can be several short fasteners having pairs of bendable metal arms which are bent outwardly and which can be riveted in position, or VELCRO TM or other fasteners can be used.

The spine 16 between the front and back covers can be made of a soft material, in which case the hinges 16a and 16b can be omitted (hinge 22 is preferably retained), or alternatively the spine 16 can be completely omitted.

The binding can be any kind of permanent binding besides a wire ring binding, e.g. it can be sewn or glued.

I claim:

1. A book comprising:
    (a) a cover,
    (b) a set of thin question pages and a set of thin answer pages,
    (c) said set of question pages containing question material printed thereon for marking an answer page,
    (d) each answer page containing matter printed thereon to be marked in accordance with questions in said question pages,
    (e) a holder, said holder being a single flat thin sheet of material,
    (f) a single substantially permanent-binding member, said binding member being connected directly between said cover, said question pages and said holder, for said single binding member permanently to secure both said question pages and said holder to said cover,
    (g) each answer page having a margin portion having holes pre-formed therein, and
    (h) securing means releasably securing said answer pages to said holder so that when said answer pages have been used, they can be removed and replaced by fresh answer pages, said securing means comprising a readily removable fastening member of small thickness connected to said holder and extending through said holes.

2. A book according to claim 1 wherein said holder is a strip of small lateral dimensions relative to said work pages.

3. A book according to claim 2 wherein said strip is located between said instructional pages and said answer pages.

4. A book according to claim 2 wherein each answer page has an inner margin portion, said inner margin portion being parallel to said binding member, said holes in said inner margin portion being first holes, said holder having second holes formed therein, and said fastening member being a bendable fastening member extending through said first and second holes.

5. A book according to claim 4 wherein each answer page has a line of weakness formed therein dividing said inner margin portion from the remainder of said answer page, so that after use said remainder can be removed from said inner margin portion without opening said securing means, thereby exposing the next answer page for marking, and after all said answer pages have been so used and removed, said inner margin portions can be removed by opening said securing means.

6. A book according to claim 5 wherein said substantially permanent binding member is a wire ring binding.

7. A book according to claim 6 wherein said strip is formed from plastic material.

8. A book according to claim 2 wherein said cover comprises front and back covers and a central spine all formed from a single integral piece of material, said strip also being formed of a plastic material, said binding member being a continuous wire ring binding extending through said question pages, said strip and said spine.

9. A book according to claim 2 wherein said cover comprises front and back covers and a central spine all formed from a single integral piece of plastic material, said strip also being formed of a plastic material, said member being a continuous wire ring binding extending through said question pages, said strip and said spine, said front and back covers each being joined to said spine by a continuous plastic hinge, said spine having a central elongated plastic hinge therein, so that said book can be opened flat and so that said front cover can be folded back to underlie said back cover.

10. A book according to claim 1 wherein said cover comprises front and back covers and a central spine all formed from a single integral piece of material, said spine having a central elongated integral hinge therein, so that said book can be opened flat and so that said front cover can be folded back to underlie said back cover.

11. A book according to claim 1 wherein said question pages are superimposed one on top of another and are arranged so that the outer edge of each underlying question page is positioned inwardly a predetermined distance from the corresponding edge of the overlying question page, the outer edge of the top question page being positioned inwardly a predetermined distance from the outer edge of said work pages.

12. A book according to claim 11 wherein said question pages contain medical questions and said answer pages contain printed answers to said questions.

* * * * *